US012700589B2

(12) United States Patent
Gao et al.

(10) Patent No.: US 12,700,589 B2
(45) Date of Patent: Aug. 4, 2026

(54) INORGANIC SCAVENGING ADDITIVE FOR USE IN A LITHIUM-ION SECONDARY BATTERY

(71) Applicant: Pacific Industrial Development Corporation, Ann Arbor, MI (US)

(72) Inventors: Shuang Gao, Ann Arbor, MI (US); Yunkui Li, Ann Arbor, MI (US); David Shepard, Canton, MI (US); Ashwin Sankaran, Arnhem (NL)

(73) Assignee: Pacific Industrial Development Corporation, Ann Arbor, MI (US)

(*) Notice: Subject to any disclaimer, the term of this patent is extended or adjusted under 35 U.S.C. 154(b) by 232 days.

(21) Appl. No.: 17/564,349

(22) Filed: Dec. 29, 2021

(65) Prior Publication Data

US 2022/0216468 A1 Jul. 7, 2022

Related U.S. Application Data

(60) Provisional application No. 63/134,214, filed on Jan. 6, 2021.

(51) Int. Cl.

| | |
|---|---|
| ***H01M 4/525*** | (2010.01) |
| ***H01M 4/02*** | (2006.01) |
| ***H01M 4/04*** | (2006.01) |
| ***H01M 4/38*** | (2006.01) |
| ***H01M 10/0525*** | (2010.01) |
| ***H01M 10/0567*** | (2010.01) |
| ***H01M 10/0568*** | (2010.01) |
| ***H01M 10/0569*** | (2010.01) |
| ***H01M 50/417*** | (2021.01) |
| ***H01M 50/497*** | (2021.01) |

(52) U.S. Cl.

CPC ......... *H01M 4/525* (2013.01); *H01M 4/0404* (2013.01); *H01M 4/382* (2013.01);

(Continued)

(58) Field of Classification Search

None

See application file for complete search history.

(56) References Cited

U.S. PATENT DOCUMENTS

| | | | | |
|---|---|---|---|---|
| 5,728,489 A * | 3/1998 | Gao | .................. | H01M 10/0565 429/309 |
| 2002/0061439 A1 | 5/2002 | Nemoto | | |

(Continued)

FOREIGN PATENT DOCUMENTS

| | | |
|---|---|---|
| CN | 105283414 A | 1/2016 |
| CN | 109478688 A | 3/2019 |
| KR | 10-0325865 B1 | 3/2002 |

OTHER PUBLICATIONS

Xu et al., Multifunctional Lithium-Ion-Exchanged Zeolite-Coated Separator for Lithium Ion Batteries, Applied Energy Materials, Nov. 2018, 1, pp. 7237-7243 (Year: 2018).*

(Continued)

*Primary Examiner* — Brian R Ohara
*Assistant Examiner* — M. T. Leonard
(74) *Attorney, Agent, or Firm* — Dickinson Wright PLLC

(57) ABSTRACT

A cell for use in an electrochemical cell, e.g., a lithium-ion secondary battery, that includes a positive electrode with an active material acting as a cathode and a current collector; a negative electrode with an active material acting as an anode and a current collector; a non-aqueous electrolyte; and a separator placed between the electrodes. At least one of the cathode and anode includes an inorganic additive in the form of a zeolite having a Si:Al ratio ranging from 2-50 that absorbs one or more of moisture, free transition metal ions, or hydrogen fluoride that become present in the cell. Multiple cells may be combined in a housing to form a lithium-ion secondary battery. The inorganic additive may be incorporated as part of the positive electrode, the negative electrode, or a combination thereof.

18 Claims, 4 Drawing Sheets

(52) U.S. Cl.
CPC ... *H01M 10/0525* (2013.01); *H01M 10/0567* (2013.01); *H01M 10/0568* (2013.01); *H01M 10/0569* (2013.01); *H01M 50/417* (2021.01); *H01M 50/497* (2021.01); *H01M 2004/021* (2013.01); *H01M 2004/027* (2013.01); *H01M 2004/028* (2013.01)

(56) References Cited

U.S. PATENT DOCUMENTS

2016/0141609 A1* 5/2016 Mikuni .................. H01M 4/62
252/508
2018/0254531 A1 9/2018 Xiao et al.
2018/0287134 A1 10/2018 Ledwoch et al.
2020/0403204 A1* 12/2020 Xiao .................. H01M 50/434
2021/0344004 A1* 11/2021 Liu ...................... H01M 4/525

OTHER PUBLICATIONS

Felice, “Novel Silicate-Based Membranes for Direct Methanol Fuel Cells”, dissertation, 2011, p. 3 (Year: 2011).*
Li et al. [Coordinatively unsaturated sites in zeolite matrix: Construction and catalysis, Chinese Journal of Catalysis 40 (2019) 1255-1281.] (Year: 2019).*
Colella et al. [The IZA Handbook of Natural Zeolites, Microporous and Mesoporous Materials, 189 (2014), pp. 4-10.] (Year: 2014).*
J.Xu, et al., Multifunctional Lithium-ion Exchanged Zeolite Coated Separator for Lithium-Ion Batteries, ACS Appl. Energy Mater., 2018, 1, 7237-7243.

* cited by examiner

INORGANIC SCAVENGING ADDITIVE FOR USE IN A LITHIUM-ION SECONDARY BATTERY

CROSS REFERENCE TO RELATED APPLICATIONS

This application claims the benefit of the filing date under 35 U.S.C. § 119(e) of U.S. Provisional Application No. 63/134,214 filed on Jan. 6, 2021, the contents of which is incorporated herein by reference in its entirety.

FIELD

This invention generally relates to inorganic scavenging additives for use in an electrochemical cell, such as a lithium-ion secondary battery. More specifically, this disclosure relates to the use of zeolites as inorganic scavenging additives located in one or more electrodes (positive or negative) of a cell used in a lithium-ion secondary battery.

BACKGROUND

The statements in this section merely provide background information related to the present disclosure and may not constitute prior art.

The main difference between a lithium-ion battery and a lithium-ion secondary battery is that the lithium-ion battery represents a battery that includes a primary cell and a lithium-ion secondary battery represents a battery that includes secondary cell. The term "primary cell" refers to a battery cell that is not easily or safely rechargeable, while the term "secondary cell" refers to a battery cell that may be recharged. As used herein a "cell" refers to the basic electrochemical unit of a battery that contains the electrodes, separator, and electrolyte. In comparison, a "battery" refers to a collection of cell(s), e.g., one or more cells, and includes a housing, electrical connections, and possibly electronics for control and protection.

Since lithium-ion (e.g., primary cell) batteries are not rechargeable, their current shelf-life is about three years, after that, they are worthless. Even with such a limited lifetime, lithium batteries can offer more in the way of capacity than lithium-ion secondary batteries. Lithium batteries use lithium metal as the anode of the battery unlike lithium ion batteries that can use a number of other materials to form the anode.

One key advantage of lithium-ion secondary cell batteries is that they are rechargeable several times before becoming ineffective. The ability of a lithium-ion secondary battery to undergo the charge-discharge cycle multiple times arises from the reversibility of the redox reactions that take place. Lithium-ion secondary batteries, because of the high energy density, are widely applied as the energy sources in many portable electronic devices (e.g., cell phones, laptop computers, etc.), power tools, electric vehicles, and grid energy storage.

In operation, a lithium-ion secondary battery generally comprises one or more cells, which includes a negative electrode, a non-aqueous electrolyte, a separator, a positive electrode, and a current collector for each of the electrodes. All of these components are sealed in a case, an enclosure, a pouch, a bag, a cylindrical shell, or the like (generally called the battery's "housing"). Separators usually are polyolefin membranes with micro-meter-size pores, which prevent physical contact between positive and negative electrodes, while allowing for the transport of lithium-ions back and forth between the electrodes. A non-aqueous electrolyte, which is a solution of lithium salt, is placed between each electrode and the separator.

During operation, it is desirable that the Coulombic or current efficiency and the discharge capacity exhibited by the battery remains relatively constant. The Coulombic efficiency describes the charge efficiency by which electrons are transferred within the battery. The discharge capacity represents the amount of charge that may be extracted from a battery. Lithium-ion secondary batteries may experience a degradation in capacity and/or efficiency due to prolonged exposure to moisture (e.g., water), hydrogen fluoride (HF), and dissolved transition-metal ions ($TM^{n+}$). In fact, the lifetime of a lithium-ion secondary battery can become severely limited once 20% or more of the original reversible capacity is lost or becomes irreversible. The ability to prolong the rechargeable capacity and overall lifetime of lithium-ion secondary batteries can decrease the cost of replacement and reduce the environmental risks for disposal and recycling.

SUMMARY

This disclosure relates generally to inorganic scavenging additives for use in an electrochemical cell, such as a lithium-ion secondary battery. More specifically, this disclosure relates to the use of zeolites as inorganic scavenging additives located in one or more electrodes (positive or negative) of a cell used in a lithium-ion secondary battery.

According to one aspect of the present disclosure, an electrochemical cell is provided that comprises a positive electrode, a negative electrode, a non-aqueous electrolyte, and a separator. The positive electrode includes an active material as a cathode for the cell and a current collector that is in contact with the cathode with lithium ions flowing from the cathode to an anode when the cell is charging. The negative electrode includes an active material as an anode for the cell and a current collector that is in contact with the anode with lithium ions flow from the anode to the cathode when the cell is discharging. The non-aqueous electrolyte is positioned between and in contact with both the negative electrode and the positive electrode, such that the non-aqueous electrolyte supports the reversible flow of lithium ions between the positive electrode and the negative electrode. The separator is placed between the positive electrode and negative electrode, such that the separator separates the anode and a portion of the electrolyte from the cathode and the remaining portion of the electrolyte. The separator is permeable to the reversible flow of lithium ions there through. An inorganic additive is dispersed within at least a portion of the positive electrode, the negative electrode, or a combination thereof. The inorganic additive is a zeolite having a silicon (Si) to aluminum (Al) ratio ranging from about 2 to about 50 that absorbs one or more of moisture, free transition metal ions, or hydrogen fluoride (HF) that become present in the cell.

According to another aspect of the present disclosure, the inorganic additive exhibits one or more of the following attributes, (i) a zeolite framework of CHA, CHI, FAU, LTA and/or LAU; (ii) particles having a morphology that is plate-like, cubic, spherical, or a combination thereof; (iii) particles having a particle size ($D_{50}$) that is in the range of about 0.01 micrometers (μm) to about 2 micrometers (μm); (iv) a surface area that is in the range of about 10 $m^2/g$ to about 1000 $m^2/g$; and (v) a pore volume range of 0.1-2.0 cc/g. The inorganic additive may include a sodium (Na) concentration that is less than 10 wt. % based on the overall weight of the inorganic additive. The inorganic additive may be a lithium-ion exchanged zeolite, such that the concentration of lithium ion is about 0.1 wt. % to about 20 wt. % based on the overall weight of the inorganic additive. The inorganic additive may scavenge transition-metal cations and hydrofluoric acid via a ion-exchange mechanism.

According to another aspect of the present disclosure, the positive electrode may comprise a lithium transition metal oxide or a lithium transition metal phosphate. The negative electrode may comprise a graphite, a lithium titanium oxide, silicon metal, or lithium metal. The separator is a polymeric membrane and the non-aqueous electrolyte is a solution of a lithium salt dispersed in an organic solvent.

According to another aspect of the present disclosure, a lithium-ion secondary battery is provided that comprises one or more electrochemical cells and one or more housings, such that an internal wall from one of the one or more housings encapsulates at least one or more of the electrochemical cells.

According to yet another aspect of the present disclosure, a pair of electrodes for use in an electrochemical cell is provided that comprise a positive electrode and a negative electrode. The positive electrode includes an active material as a cathode for the cell and a current collector that is in contact with the cathode with lithium ions flow from the cathode to the anode when the cell is charging. The negative electrode includes an active material as an anode for the cell and a current collector that is in contact with the anode with lithium ions flow from the anode to the cathode when the cell is discharging. An inorganic additive is dispersed within at least a portion of the positive electrode, the negative electrode, or a combination thereof as previously discussed above and as further defined herein. The inorganic additive being a zeolite having a silicon (Si) to aluminum (Al) ratio ranging from about 2 to about 50 that absorbs one or more of moisture, free transition metal ions, or hydrogen fluoride (HF) that become present in the cell.

Further areas of applicability will become apparent from the description provided herein. It should be understood that the description and specific examples are intended for purposes of illustration only and are not intended to limit the scope of the present disclosure.

DESCRIPTION OF THE DRAWINGS

In order that the disclosure may be well understood, there will now be described various forms thereof, given by way of example, reference being made to the accompanying drawings. The components in each of the drawings may not necessarily be drawn to scale, but rather emphasis is placed upon illustrating the principles of the invention.

Figure 1A:
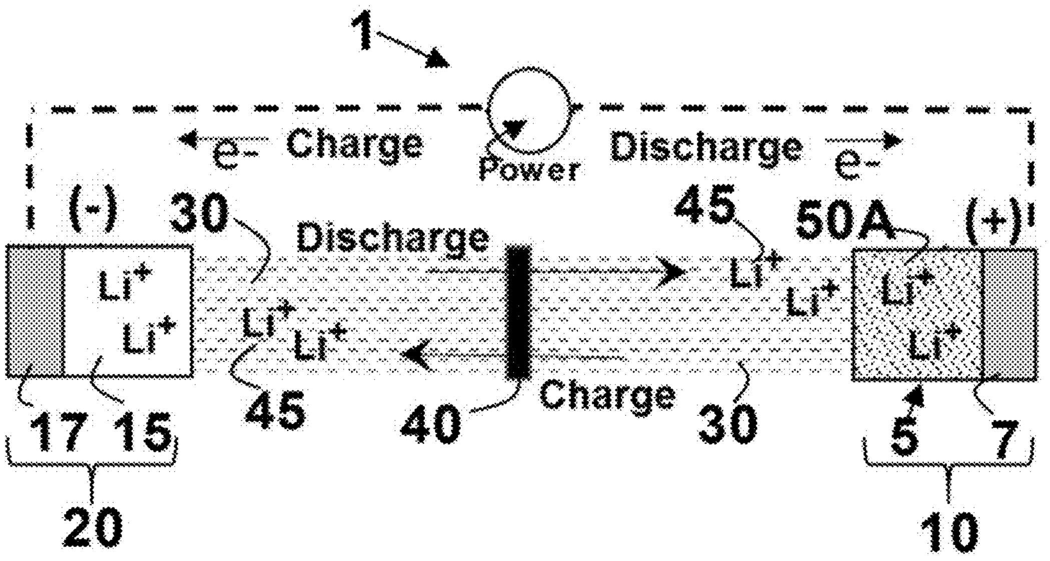
FIG. 1A is a schematic representation of a lithium-ion secondary cell formed according to the teachings of the present disclosure in which an inorganic additive forms a portion of the positive electrode.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the zeolites made and used according to the teachings contained herein is described throughout the present disclosure in conjunction with a secondary cell for use in a lithium-ion secondary battery in order to more fully illustrate the structural elements and the use thereof. The incorporation and use of such inorganic materials as additives in other applications, including without limitation in other electrochemical cells, such as for example a primary cell used in a lithium-ion battery, is contemplated to be within the scope of the present disclosure. It should be understood that throughout the description and drawings, corresponding reference numerals indicate like or corresponding parts and features.

For the purpose of this disclosure, the terms "about" and "substantially" are used herein with respect to measurable values and ranges due to expected variations known to those skilled in the art (e.g., limitations and variability in measurements).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one metal", "one or more metals", and "metal(s)" may be used interchangeably and are intended to have the same meaning.

The present disclosure generally provides an inorganic material that comprises, consists essentially of, or consists of one or more types of a zeolite having a silicon (Si) to aluminum (Al) ratio ranging from about 2 to about 50 that can absorb malicious species, such as moisture ($H_2O$), free transition-metal ions ($TM^{n+}$), and/or hydrogen fluoride (HF) that may become present or formed within the housing of a lithium-ion secondary battery. The removal of these malicious species prolongs the battery's calendar and cycle lifetime when the inorganic material is applied to at least one of the positive electrode and negative electrode.

In order to deal with the problems as discussed above, the inorganic material acts as a trapping agent or scavenger for the malicious species present within the housing of the battery. The inorganic material accomplishes this objective by effectively absorbing moisture, free transition-metal ions, and/or hydrogen fluoride (HF) selectively, while having no effect on the performance of the non-aqueous electrolyte, including the lithium-ions and organic transport medium contained therein. The multifunctional inorganic particles may be introduced into the lithium-ion secondary battery or each cell therein as at least one of an additive to the positive electrode, an additive to negative electrode, or a combination thereof.

Figure 1B:
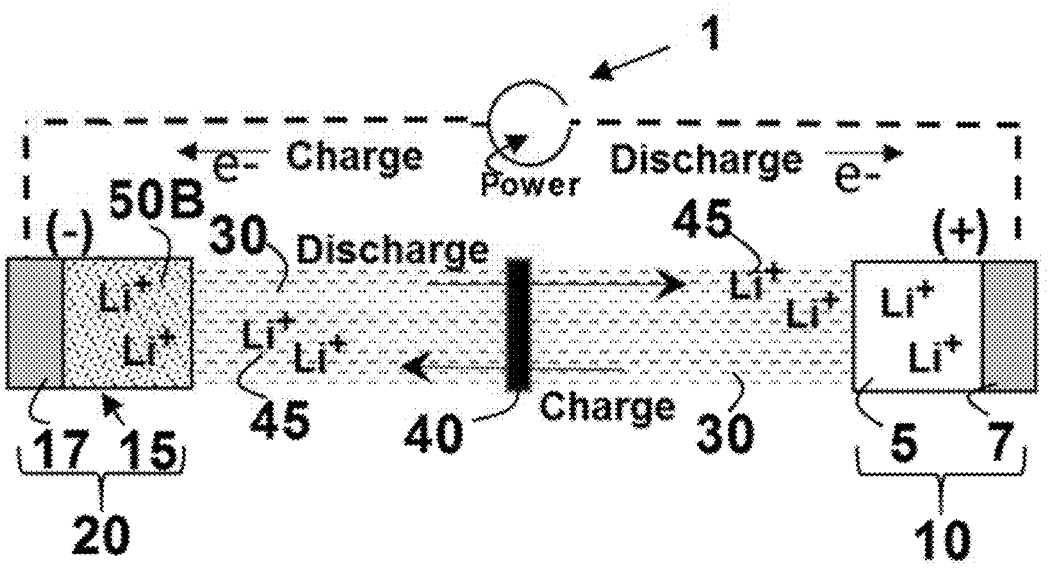
FIG. 1B is a schematic representation of another lithium-ion secondary cell formed according to the teachings of the present disclosure in which an inorganic additive forms a portion of the negative electrode.

Referring to FIGS. 1A and 1B, a secondary lithium-ion cell 1 generally comprises a positive electrode 10, a negative electrode 20, a non-aqueous electrolyte 30, and a separator 40. The positive electrode 10 comprises an active material that acts as a cathode 5 for the cell 1 and a current collector 7 that is in contact with the cathode 5, such that lithium ions 45 flow from the cathode 5 to the anode 15 when the cell 1 is charging. Similarly, the negative electrode 20 comprises an active material that acts as an anode 15 for the cell 1 and a current collector 17 that is in contact with the anode 15, such that lithium ions 45 flow from the anode 15 to the cathode 5 when the cell 1 is discharging. The contact between the cathode 5 and the current collector 7, as well as the contact between the anode 15 and the current collector 17, may be independently selected to be direct or indirect contact; alternatively, the contact between the anode 15 or cathode 5 and the corresponding current collector 17, 7 is directly made.

The non-aqueous electrolyte 30 is positioned between and in contact with, i.e., in fluid communication with, both the negative electrode 20 and the positive electrode 10. This non-aqueous electrolyte 30 supports the reversible flow of lithium ions 45 between the positive electrode 10 and the negative electrode 20. The separator 40 is placed between the positive electrode 10 and negative electrode 20, such that the separator 40 separates the anode 15 and a portion of the electrolyte 30 from the cathode 5 and the remaining portion of the electrolyte 30. The separator 40 is permeable to the reversible flow of lithium ions 45 there through.

Still referring to FIGS. 1A and 1B, at least one of the cathode 5 and the anode 15 includes an inorganic additive 50A, 50B that absorbs one or more of moisture, free transition metal ions, or hydrogen fluoride (HF), as well as other malicious species that become present in the cell. The inorganic additive 50A, 50B may be incorporated within the composition of at least one of the positive electrode 10, negative electrodes 20, or combination thereof. Alternatively, the inorganic additive 50A, 50B selectively absorbs moisture, free transition metal ions, and/or hydrogen fluoride (HF). This inorganic additive 50A, 50B may be selected to be one or more types of a zeolite having a silicon (Si) to aluminum (Al) ratio ranging from about 1 to 100; alternatively, about 2 to 75; alternatively, about 2 to 50; alternatively, between about 2 and 25; alternatively, ranging from about 2 to about 20; alternatively, ranging from about 5 to about 15.

The inorganic additive of the present disclosure comprises at least one or a combination selected from different types of zeolites having a framework chosen from, but not limited to ABW, AFG, BEA, BHP, CAS, CHA, CHI, DAC, DOH, EDI, ESV, FAU, FER, FRA, GIS, GOO, GON, HEU, KFI, LAU, LTA, LTN, MEI, MER, MOR, MSO, NAT, NES, PAR, PAU, PHI, RHO, RTE, SOD, STI, TER, THO, VET, YUG, and ZSM. Alternatively, the framework of the zeolite is chosen from a CHA, CHI, FAU, LTA or LAU framework.

According to one aspect of the present disclosure, the inorganic additive 50A, 50B may be dispersed within at least a portion of the positive electrode (see 50A in FIG. 1A) and/or the negative electrode (see 50B in FIG. 1B) in the secondary cell. The amount of the inorganic additive present in the secondary cell may be up to 10 wt. %; alternatively, up to 5 wt. %; alternatively, between 0.1 wt. % and 5 wt. %, relative to the overall weight of the electrode in which the inorganic additive is present, namely, the positive electrode and/or the negative the electrode.

Zeolites are crystalline or quasi-crystalline aluminosilicates comprised of repeating $TO_4$ tetrahedral units with T being most commonly silicon (Si) or aluminum (Al). These repeating units are linked together to form a crystalline framework or structure that includes cavities and/or channels of molecular dimensions within the crystalline structure. Thus, aluminosilicate zeolites comprise at least oxygen (O), aluminum (Al), and silicon (Si) as atoms incorporated in the framework structure thereof. Since zeolites exhibit a crystalline framework of silica ($SiO_2$) and alumina ($Al_2O_3$) interconnected via the sharing of oxygen atoms, they may be characterized by the ratio of $SiO_2$:$Al_2O_3$(SAR) present in the crystalline framework.

The inorganic additive of the disclosure exhibits a framework topology of a chabazite (framework notation="CHA"), chiavennite (CHI), faujasite (FAU), linde type A (LTA), and laumontite (LAU). The framework notation represents a code specified by the International Zeolite Associate (IZA) that defines the framework structure of the zeolite. Thus, for example, a chabazite means a zeolite in which the primary crystalline phase of the zeolite is "CHA".

The crystalline phase or framework structure of a zeolite may be characterized by X-ray diffraction (XRD) data. However, the XRD measurement may be influenced by a variety of factors, such as the growth direction of the zeolite; the ratio of constituent elements; the presence of an adsorbed substance, defect, or the like; and deviation in the intensity ratio or positioning of each peak in the XRD spectrum. Therefore, a deviation of 10% or less; alternatively, 5% or less; alternatively, 1% or less in the numerical value measured for each parameter of the framework structure for each zeolite as described in the definition provided by the IZA is within expected tolerance.

According to one aspect of the present disclosure, the zeolites of the present disclosure may include natural zeolites, synthetic zeolites, or a mixture thereof. Alternatively, the zeolites are synthetic zeolites because such zeolites exhibit greater uniformity with respect to SAR, crystallite size, and crystallite morphology, as well has fewer and less concentrated impurities (e.g. alkaline earth metals).

The inorganic additive 50A, 50B may comprise a plurality of particles having or exhibiting a morphology that is plate-like, cubic, spherical, or a combination thereof. Alternatively, the morphology is predominately, spherical in nature. These particles may exhibit an average particle size ($D_{50}$) that is in the range of about 0.005 micrometers (μm) to about 10 micrometers (μm); alternatively about 0.01 micrometers (μm) to about 5 micrometers (μm); alternatively, 0.01 micrometers (μm) to about 2 micrometers (μm); alternatively, 0.05 micrometer (μm) to about 1.5 micrometers (μm); alternatively, greater than or equal to 0.01 μm; alternatively, greater than or equal to 0.05 μm; alternatively, less than 5 μm; alternatively, less than or equal to 2 μm. Scanning electron microscopy (SEM) or other optical or digital imaging methodology known in the art may be used to determine the shape and/or morphology of the inorganic additive. The average particle size and particle size distributions may be measured using any conventional technique, such as sieving, microscopy, Coulter counting, dynamic light scattering, or particle imaging analysis, to name a few. Alternatively, a laser particle analyzer is used for the determination of average particle size and its corresponding particle size distribution.

The inorganic additive 50A, 50B may also exhibit surface area that is in the range of about 5 $m^2/g$ to about 5000 $m^2/g$; alternatively from about 10 $m^2/g$ to about 2500 $m^2/g$; alternatively, from about 10 $m^2/g$ to about 1000 $m^2/g$; alternatively, about 25 $m^2/g$ to about 750 $m^2/g$. The pore volume of the inorganic additive 50A, 50B may be in the range of about 0.05 cc/g to about 3.0 cc/g; alternatively, 0.1 cc/g to about 2.0 cc/g; alternatively 0.15 cc/g to about 1.5 cc/g. The measurement of surface area and pore volume for the inorganic additive may be accomplished using any known technique, including without limitation, microscopy, small angle x-ray scattering, mercury porosimetry, and Brunauer, Emmett, and Teller (BET) analysis. Alternatively, the surface area and pore volume are determined using Brunauer, Emmett, and Teller (BET) analysis.

The inorganic additive 50A, 50B may include an initial sodium (Na) concentration of about 0.05 wt. % to about 25 wt. % based on the overall weight of the inorganic additive. Alternatively, the initial Na concentration may range from about 0.1 wt. % to about 20 wt. %; alternatively, from about 0.25 wt. % to about 15 wt. %. The inorganic additive may be a lithium-ion exchanged zeolite, such that lithium ions replace at least a portion of the sodium ions in the framework by ion-exchanging. Lithium ions replace some of the initial sodium ions in the framework by ion-exchanging to reach a concentration that is between 0.1 wt. % and 20 wt. %. Alternatively, the concentration of lithium ion is about 0.1 wt. % to about 10 wt. %; alternatively, about 0.15 wt. % to about 9 wt. %; alternatively, about 0.2 wt. % to about 8 wt. %; alternatively, about 0.5 wt. % to about 7.5 wt. %; alternatively, about 0.5 wt. % to about 5.0 wt. %, based on the overall weight of the Li-exchanged zeolites. The final sodium (Na) concentration in the inorganic additive after undergoing lithium-ion exchange is lower than 15 wt. %; alternatively, less than 10 wt. %; alternatively, less than 7.5 wt. %. When desirable, the inorganic additive may further include one or more doping elements selecting from Li, Na, Al, Mn, Sm, Y, Cr, Eu, Er, Ga, Zr, and Ti.

The active materials in the positive electrode 10 and the negative electrode 20 may be any material known to perform this function in a lithium-ion secondary battery. The active material used in the positive electrode 10 may include, but not be limited to lithium transition metal oxides or transition metal phosphates. Several examples of active materials that may be used in the positive electrode 10 include, without limitation, $LiCoO_2$, $LiNi_{1-x-y}Co_xMn_yO_2$ ($x+y\leq 2/3$), $zLi_2MnO_3\cdot(1-z)LiNi_{01-x-y}Co_xMn_yO_2$ ($x+\leq_{2/3}$), $LiMn_2O_4$, $LiNi_{0.5}Mn_{1.5}O_4$, and $LiFePO_4$. The active materials used in the negative electrode 15 may include, but not be limited to graphite and $Li_4Ti_5O_{12}$, as well as silicon and lithium metal. Alternatively, the active material for use in the negative electrode is silicon or lithium metal due to their one-magnitude higher specific capacities. The current collectors 7, 17 in both the positive 10 and negative 20 electrodes may be made of any metal known in the art for use in an electrode of a lithium battery, such as for example, aluminum for the cathode and copper for the anode. The cathode 5 and anode 15 in the positive 10 and negative 20 electrodes are generally made up of two dissimilar active materials.

The non-aqueous electrolyte 30 is used to support the oxidation/reduction process and provide a medium for lithium ions to flow between the anode 15 and cathode 5. The non-aqueous electrolyte 30 may be a solution of a lithium salt in an organic solvent. Several examples of lithium salts, include, without limitation, lithium hexafluorophosphate ($LiPF_6$), lithium bis(oxalato)-borate (LiBOB), and lithium bis(trifluoro methane sulfonyl)imide (LiTFSi). These lithium salts may form a solution with an organic solvent, such as, for example, ethylene carbonate (EC), ethyl methyl carbonate (EMC), diethyl carbonate (DEC), dimethyl carbonate (DMC), propylene carbonate (PC), vinylene carbonate (VC), and fluoroethylene carbonate (FEC), to name a few. A specific example of an electrolyte is a 1 molar solution of $LiPF_6$ in a mixture of ethylene carbonate and diethyl carbonate (EC/DEC=50/50 vol.).

The separator 40 ensures that the anode 15 and cathode 5 do not touch and allows lithium ions to flow there through. The separator 40 may be a polymeric membrane comprising, without limitation, polyolefin based materials with semi-crystalline structure, such as polyethylene, polypropylene, and blends thereof, as well as micro-porous poly(methyl methacrylate)-grafted, siloxane grafted polyethylene, and polyvinylidene fluoride (PVDF) nanofiber webs.

Figure 2A:
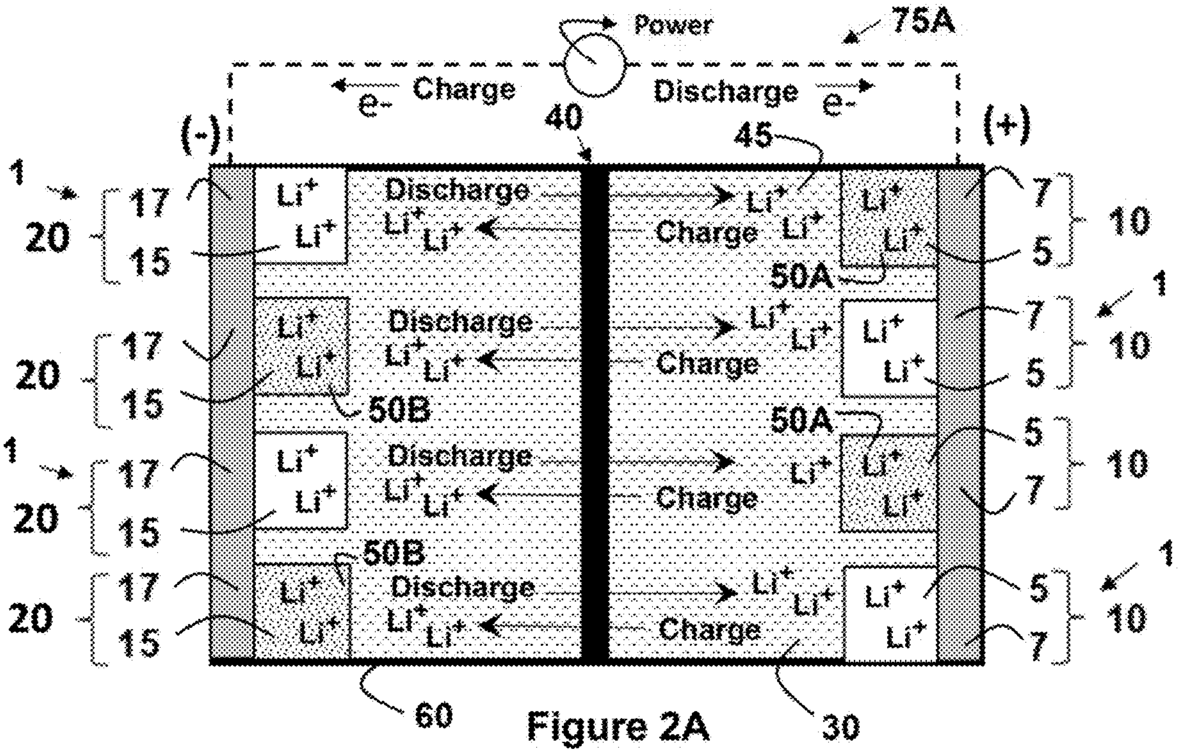
FIG. 2A is a schematic representation of a lithium-ion secondary battery formed according to the teachings of the present disclosure showing the layering of the secondary cells of FIGS. 1A and 1B to form a larger mixed cell.
Figure 2B:
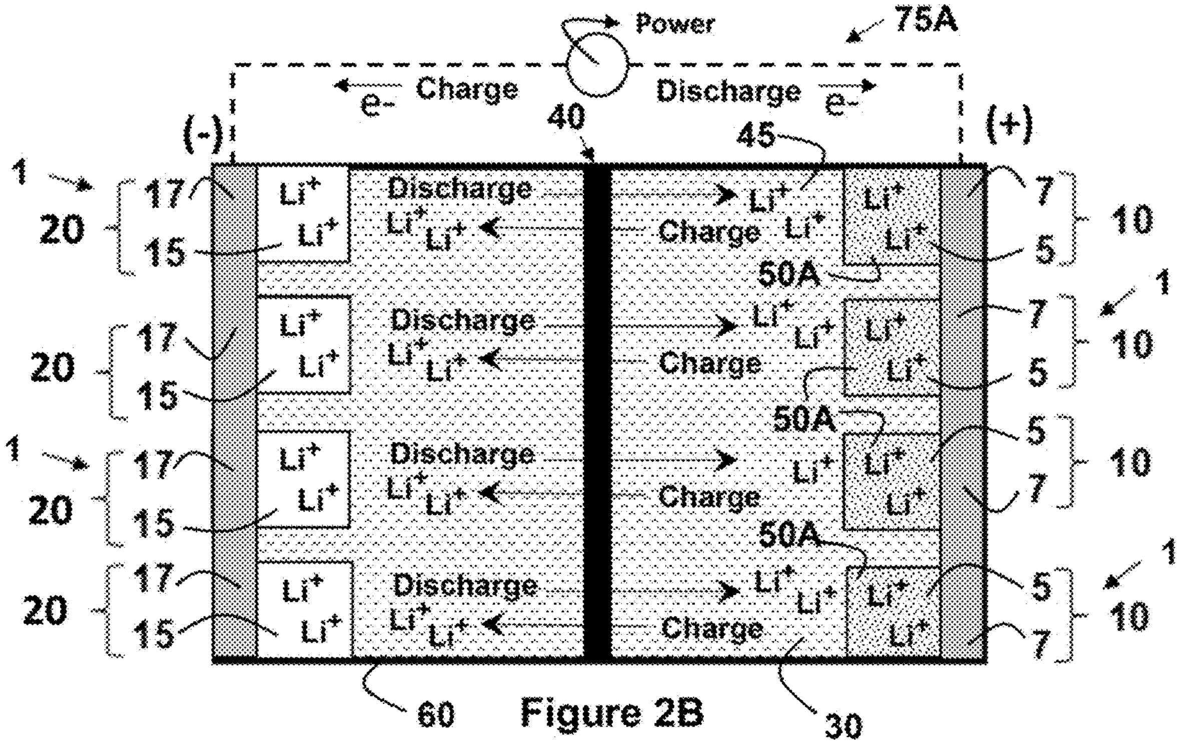
FIG. 2B is a schematic representation of a lithium-ion secondary battery formed according to the teachings of the present disclosure showing the layering of multiple secondary cells of FIG. 1A to form a larger mixed cell.

According to another aspect of the present disclosure, one or more secondary cells may be combined to form a lithium-ion secondary battery. In FIG. 2A, an example of such a battery 75A is shown in which the four (4) secondary cells of FIGS. 1A and 1B are layered to form a larger single secondary cell that is encapsulated to produce the battery 75A. Another example of a battery 75A is shown in FIG. 2B in which four (4) secondary cells of FIG. 1A are layered to form a larger single secondary cell that is encapsulated to produce the battery 75A. One skilled in the art will understand that any multiple of secondary cells comprising the inorganic additive 50A, 50B may be used to form a battery 75A without exceeding the scope of the present disclosure. When desirable, the battery 75A may include one or more secondary cells that does not include the inorganic additive 50A, 50B provided that at least one secondary cell in the battery 75A includes the inorganic additive 50A, 50B.

Figure 3A:
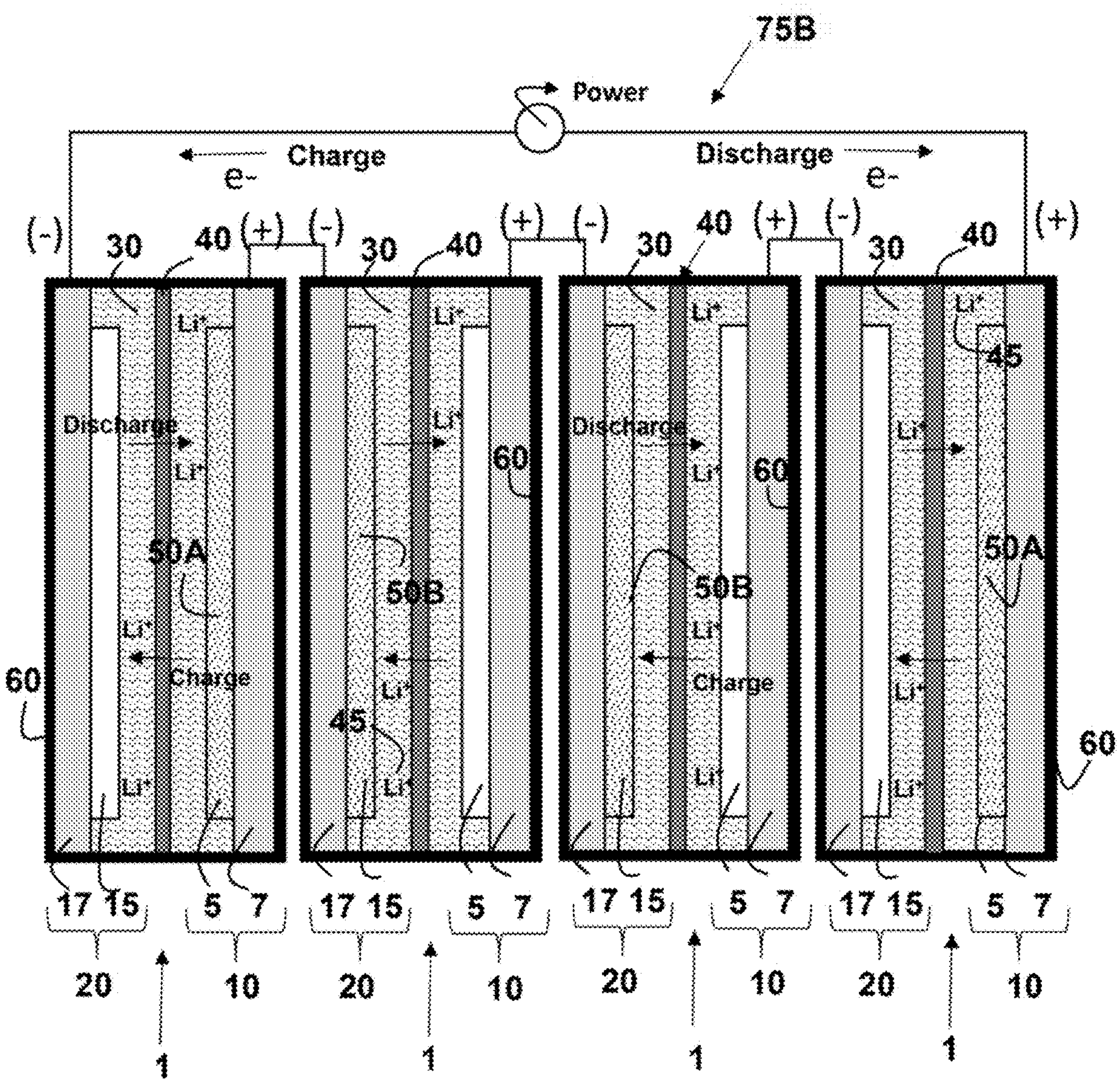
FIG. 3A is a schematic representation of a lithium-ion secondary battery formed according to the teachings of the present disclosure showing the incorporation of the secondary cells of FIGS. 1A and 1B in series.
Figure 3B:
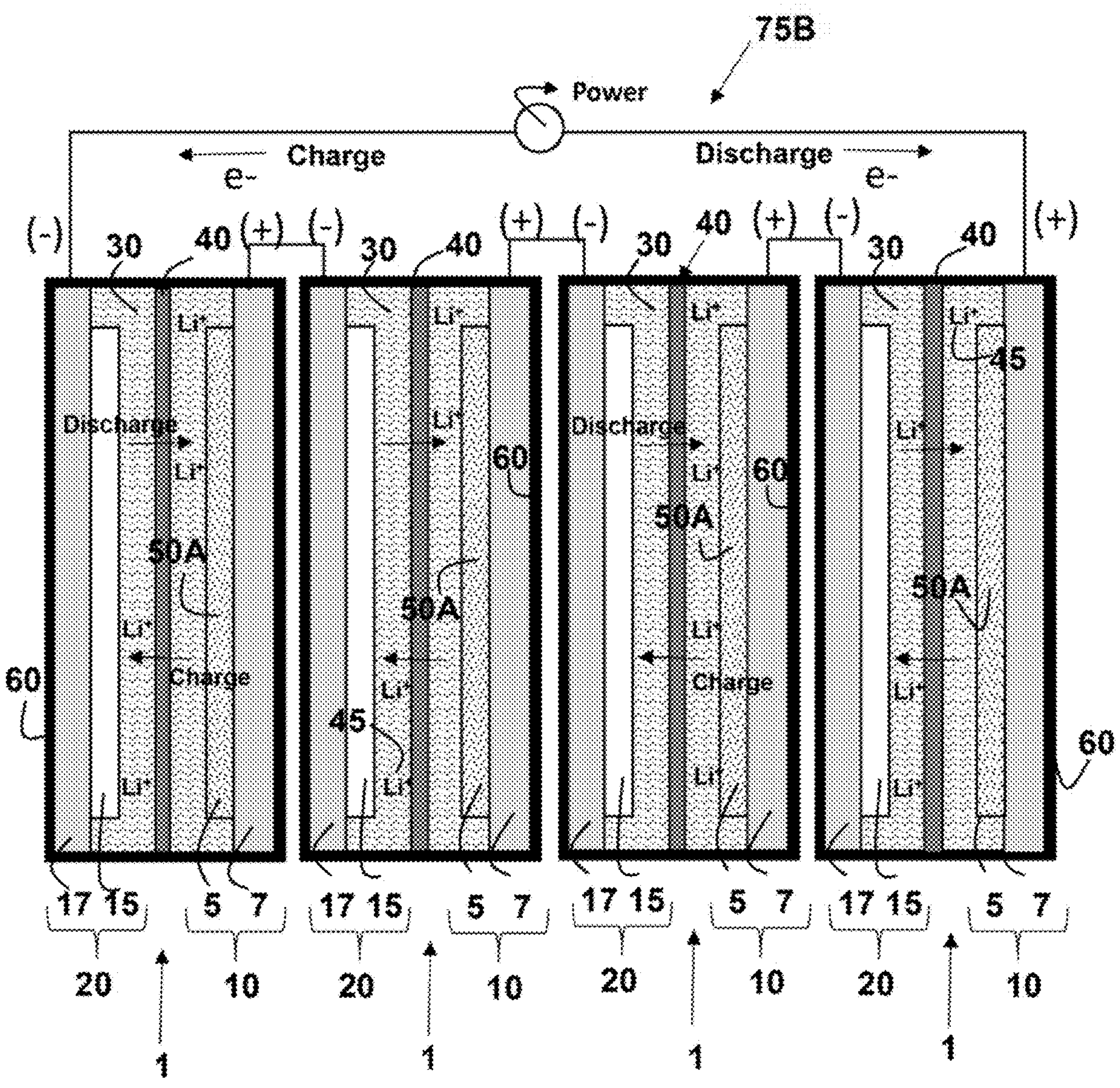
FIG. 3B is a schematic representation of a lithium-ion secondary battery formed according to the teachings of the present disclosure showing the incorporation of multiple secondary cells of FIG. 1A in series.

Referring now to FIG. 3A, another example of a battery 75B is shown, in which the four (4) secondary cells of FIGS. 1A and 1B are stacked or placed in series to form a larger capacity battery 75B with each cell being individually contained. Referring also to FIG. 3B, another example of the battery 75B is shown, in which four (4) secondary cells of FIG. 1A are stacked or placed in series to form the larger capacity battery 75B with each cell being individually contained. The lithium-ion secondary batteries 75A, 75B shown in FIGS. 2A-3B also include a housing 60 having an internal wall in which the secondary cells 1 are enclosed or encapsulated in order to provide for both physical and environmental protection. One skilled in the art will understand that although the battery 75B shown in FIG. 3A incorporate the four secondary cells of FIGS. 1A and 1B and the battery shown in FIG. 3B incorporates four secondary cells of FIG. 1A that the battery 75B is not limited thereby and may include any other number of cells with the inorganic additive incorporated as shown in FIGS. 1A and 1B. In addition, the battery 75B may include one or more in which the inorganic additive 50A, 50B is not incorporated or included provided that at least one of the cells in the battery 75B incorporates the inorganic additive 50A, 50B.

The housing 60 may be constructed of any material known for such use in the art. Lithium-ion batteries generally are housed in three different main form factors or geometries, namely, cylindrical, prismatic, or soft pouch. The housing 60 for a cylindrical battery may be made of aluminum, steel, or the like. Prismatic batteries generally comprise a housing 60 that is rectangular shaped rather than cylindrical. Soft pouch housings 60 may be made in a variety of shapes and sizes. These soft housings may be comprised of an aluminum foil pouch coated with a plastic on the inside, outside, or both. The soft housing 60 may also be a polymeric-type encasing. The polymer composition used for the housing 60 may be any known polymeric materials that are conventionally used in lithium-ion secondary batteries. One specific example, among many, include the use of a laminate pouch that comprises a polyolefin layer on the inside and a polyamide layer on the outside. A soft housing 60 needs to be designed such that the housing 60 provides mechanical protection for the secondary cells 1 in the battery 75A, 75B.

A variety of factors can cause degradation in lithium-ion secondary batteries. One of these factors is the existence of various malicious species in the non-aqueous electrolyte. These malicious species include moisture (e.g., water or water vapor), hydrogen fluoride (HF), and dissolved transition-metal ions ($TM^{n+}$).

Moisture in the electrolyte mainly arises as a fabrication residue and from the decomposition of the organic electrolyte. Although a dry environment is desired, the presence of moisture cannot be thoroughly excluded during the production of a battery or battery cell. The organic solvent in the electrolyte is inclined to decompose to yield $CO_2$ and $H_2O$, especially when the battery is operated at a high temperature. The water ($H_2O$) can react with a lithium salt, such as $LiPF_6$, resulting in the generation of lithium fluoride (LiF) and hydrogen fluoride (HF). The reactions that occur from moisture residue being present in a Li-ion battery are shown in Equations 1) and 2), wherein M stands for a transition metal that is typically present in the material of the positive electrode.

Eq. 1) $LiPF_6 + H_2O \longrightarrow HF + LiF\downarrow + H_3PO_4$

Eq. 2) $LiMO_2 + HF \longrightarrow LiF\downarrow + M^{2+} + H_2O$

The lithium fluoride (LiF), which is insoluble, can deposit on the surfaces of the active materials of the anode or cathode forming a solid electrolyte interface (SEI). This solid electrolyte interface (SEI) may reduce or retard the lithium-ions (de)intercalation and inactivate the surface of the active material, thereby, leading to a poor rate capability and/or capacity loss.

Furthermore, hydrogen fluoride (HF), when present, may attack the positive electrode, which contains transition metal and oxygen ions, resulting in the formation of more water and transition metal compounds that are compositionally different from the active material. When water is present and acts as a reactant, the reactions that occur may become cyclic, resulting in continual damage to the electrolyte and the active material.

In addition, the transition metal compounds that are formed may be insoluble and electrochemically inactive. These transition metal compounds may reside on the surface of the positive electrode, thereby, forming an SEI. On the other hand, any soluble transition metal compounds may dissolve into the electrolyte resulting in transition metal ions ($TM^{n+}$). These free transition metal ions, such as, for example, $Mn^{2+}$ and $Ni^{2+}$, can move towards the anode where they may be deposited as an SEI leading to the introduction of a variety of different reactions. These reactions, which may consume the active materials of the electrodes and the lithium-ions present in the electrolyte, can also lead to capacity loss in the lithium-ion secondary battery.

In order to suppress the degradation caused by the above-mentioned factors, the zeolite additive of the present disclosure, preferably ion-exchanged with lithium (Li), scavenges the malicious species, including free transition-metal ions, hydrofluoric acid, and/or moisture present in the secondary Li-ion cell. The end result of incorporating the zeolite additive into the positive or negative electrode is an extension of the cell's overall cycle life. Although not wanting to held to theory, it is believed that the cyclic reactions as shown in equations 1) and 2) are broken by ion-exchange that occurs when the Li-exchanged zeolite reacts with HF to form LiF and an H-exchanged zeolite, rather than forming a metal fluoride and water.

The inorganic additive may be incorporated into at least one of the composite cathode (positive electrode) and/or the composite anode (negative electrode) during the formation or manufacturing of the electrode. For example, a zeolite powder can be mixed with an anode active material, a conductive agent, and polymeric binder to form an anode film. Similarly, a zeolite powder can be mixed with a cathode active material, a conductive agent, and polymeric binder to form a cathode film.

The specific examples provided in this disclosure are given to illustrate various embodiments of the invention and should not be construed to limit the scope of the disclosure. The embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Example 1—Li-Zeolite Powder as Inorganic Additive

A FAU-type zeolite is synthesized by a hydrothermal route. The particles are in porous spheres, with $D_{10}$, $D_{50}$, and $D_{90}$ being measured to be 0.5, 1.0, and 1.5 μm, respectively. The surface area is measured to be 500 $m^2/g$, while the pore volume is 0.2 cc/g. The silica to alumina ratio (SAR) for the zeolite is between 2 and 10. The zeolite initially comprised sodium ions, which then underwent $Na^+$ exchange with $Li^+$. The concentrations of $Na_2O$ and $Li_2O$ in the zeolite are measured to be in the range of 0.1-2.0% and 3.0-9.0%, respectively. The zeolite is dried to remove any residual moisture.

Example 2—Transition-Metal Cations Trapping Capability of the Inorganic Additive The performance of the inorganic additive of Example 1 with respect to adsorption capabilities for $Mn^{2+}$, $Ni^{2+}$, and $Co^{2+}$, are measured in an organic solvent, namely a mixture of ethylene carbonate and dimethyl carbonate (EC/DMC=50/50 vol.)

The $Mn^{2+}$, $Ni^{2+}$, and $Co^{2+}$ trapping capabilities of the inorganic additive in the organic solvent are analyzed by inductively coupled plasma-optical emission spectrometry (ICP-OES). The organic solvent is prepared, such that it contains 1000 ppm manganese (II), nickel (II), and cobalt (II) perchlorate, respectively. The inorganic additive in particle form is added as 1 wt. % of the total mass, with the mixture being stirred for 1 minute, then allowed to stand still at 25° C. for 24 hours prior to measuring the decrease of the concentration of $Mn^{2+}$, $Ni^{2+}$, and $Co^{2+}$.

The inorganic additive was observed to provide a substantial reduction in the presence of the $Mn^{2+}$, $Ni^{2+}$, and $Co^{2}$ ions in the solvent.

Example 3—HF Scavenging Capability of the Inorganic Additive

The HF scavenging capability of the inorganic additive of Example 1 in the non-aqueous electrolyte, namely 1 M $LiPF_6$ in a mixture of ethylene carbonate and dimethyl carbonate (EC/DMC=50/50 vol.), is analyzed by a fluoride ion specific (ISE) meter. The electrolyte solution is prepared, such that it contains 100 ppm HF. The inorganic additive in particle form is added as 1 wt. % of the total mass, with the mixture being stirred for 1 minute, then allowed to stand still at 25° C. for 24 hours prior to measuring the decrease of $F^-$ in the solution. Another measurement is conducted after a 240 hour time period.

The reactions that occur in a Li-ion battery with moisture residue is shown in Equations 1) and 2). As a result, in order to reduce HF in the electrolyte, the inorganic additive consumes the HF and moisture residue at the same time, thereby, breaking the reaction chain.

The inorganic additive was observed to provide a substantial reduction in the presence of HF in the solvent.

Example 4—Electrode Fabrication with Inorganic Additive

Films for use as the positive electrode are fabricated using a slurry in which the active material (AM), such as $LiNi_{0.8}Co_{0.1}Mn_{0.1}O_2$, the inorganic zeolite additive (IA) of Example 1, and carbon black (CB) powders dispersed in an n-methyl-2-pyrrolidone (NMP) solution of polyvinylidene fluoride (PVDF). The mass ratio of AM:IA:CB:PVDF in the slurry is (90−x):x:5:5, wherein x is greater than zero (0) and less than or equal to 10. In each case, the slurry is blade coated onto aluminum films. After drying and calendaring, the thickness of each positive electrode film formed is measured to be in the range of 50-150 μm. The positive electrode films are punched into a round disks in a diameter of 12 mm. The mass loading of active material in the positive electrode film is in the range of 5-15 mg/cm$^2$. One skilled in the art will understand that a negative electrode film may be prepared in a similar fashion

Example 5—Comparative Electrode Fabrication without Inorganic Additive

Films for use as the positive electrode are fabricated using a slurry in which the active material (AM), such as $LiNi_{0.8}Co_{0.1}Mn_{0.1}O_2$, and carbon black (CB) powders dispersed in an n-methyl-2-pyrrolidone (NMP) solution of polyvinylidene fluoride (PVDF). The mass ratio of AM:CB:PVDF in the slurry is 90:5:5. In each case, the slurry is blade coated onto aluminum films. After drying and calendaring, the thickness of each positive electrode film formed is measured to be in the range of 50-150 μm. The positive electrode films are punched into a round disks in a diameter of 12 mm. The mass loading of active material in the positive electrode film is in the range of 5-15 mg/cm$^2$.

Example 6—Coin-Cell Preparation

Coin cells (2025-type) are made for evaluating the inorganic additives in an electrochemical situation and comparing the performance of said additives against a similar cell without the additives. A coin cell is made with exterior casing, spacer, spring, current collector, positive electrode, separator, negative electrode, and non-aqueous electrolyte.

The positive electrode film was used as formed in Example 4 for coin cells prepared with the inorganic additive and in Example 5 for coin cells prepared without the inorganic additive.

Lithium metal foil (0.75 mm in thickness) is cut into a round disk in a diameter of 14 mm as the negative electrode.

The separator is formed from a piece of monolayer polypropylene membrane (Celgard® 2500, Celgard LLC, North Carolina) that is punched into round disks having a diameter of 19 mm.

Coin cells (2025-type) are made using the positive electrode films from Examples 4 or 5 along with the abovementioned negative electrodes, separator, and 1 M $LiPF_6$ in a mixture of ethylene carbonate and dimethyl carbonate (EC/DMC=50/50 vol.) as the electrolyte as further described herein for battery performance testing.

Example 7—Electrochemical Cycling

The coin cells made in Example 6 that contain an electrode of the present disclosure as prepared in Example 4 are tested and compared to coin cells formed with a conventional electrode from Comparative Example 5. Each of the cells are cycled between 3 and 4.3 V at the current loadings of C/3 at 25° C. after two C/10 formation cycles.

In the first formation cycle, the cells with the conventional electrode (Comparative Example 5) and the cell with the electrode formed according to the present disclosure (Example 4) show a discharge capacity and a coulombic efficiency that are approximately the same. After 100 cycles of C/5 charge-and-discharge, the cell with the electrode formed according to the present disclosure (Example 4) shows a capacity loss that is less than the loss in capacity exhibited by the cells with the conventional commercial electrode (Comparative Example 5). Similarly, the coulombic efficiency of the cell with the electrode of the present disclosure (Example 4) degrades less than that observed to occur for the cells with the conventional electrode (Comparative Example 5).

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A cell for use in an electrochemical cell, the cell comprising:

a positive electrode, the positive electrode comprising an active material as a cathode for the cell and a current collector that is in contact with the cathode; wherein lithium ions flow from the cathode to an anode when the cell is charging;

a negative electrode, the negative electrode comprising an active material as the anode for the cell and a current collector that is in contact with the anode; wherein lithium ions flow from the anode to the cathode when the cell is discharging;

a non-aqueous electrolyte positioned between and in contact with both the negative electrode and the positive electrode; wherein the non-aqueous electrolyte supports the reversible flow of lithium ions between the positive electrode and the negative electrode; and a separator placed between the positive electrode and negative electrode, such that the separator separates the anode and a portion of the electrolyte from the cathode and the remaining portion of the electrolyte;

wherein the separator is permeable to the reversible flow of lithium ions there through;

wherein an inorganic additive is dispersed within at least a portion of the positive electrode, the negative electrode, or a combination thereof, and is absent from the non-aqueous electrolyte and the separator;

the inorganic additive being one or more zeolites having a zeolite framework of CHA, CHI, FAU, LTA, or LAU with a silicon (Si) to aluminum (Al) ratio ranging from about 2 to about 50 that absorbs one or more of moisture, free transition metal ions, or hydrogen fluoride (HF) that become present in the cell;

wherein the inorganic additive comprises particles having a morphology that is plate-like, cubic, spherical, or a combination thereof and an average particle size (D5o) that is in the range of 0.05 micrometers (um) to about 1.5 micrometers (um);

wherein the inorganic additive comprises a concentration of greater than or equal to 0.07 wt. % and less than 10 wt. % sodium (Na) ions and a concentration of 3 wt. % to 7.5 wt. % lithium (Li) ions based on the overall weight of the inorganic additive;

wherein the cell after 100 cycles of C/5 charge-and-discharge exhibits a loss in discharge capacity and in Coulombic efficiency that is less than a loss in discharge capacity and Coulombic efficiency exhibited by a cell having the same composition except for the inorganic additive.

2. The cell according to claim 1, wherein the inorganic additive further comprises at least one of the following attributes:

(i) particles having the morphology that is spherical;

(ii) a surface area that is in the range of about 10 m2/g to about 1000 m2/g; and (iii) a pore volume range of 0.1-2.0 cc/g.

3. The cell according to claim 1, wherein the inorganic additive includes a sodium (Na) concentration that is less than 7.5 wt. % based on the overall weight of the inorganic additive.

4. The cell according to claim 1, wherein the inorganic additive is a lithium-ion exchanged zeolite.

5. The cell according to claim 1, wherein the inorganic additive scavenges transition-metal cations and hydrofluoric acid via an ion-exchange mechanism.

6. The cell according to claim 1, wherein the positive electrode comprises a lithium transition metal oxide or a lithium transition metal phosphate;

the negative electrode comprises graphite, a lithium titanium oxide, silicon metal, or lithium metal;

the separator is a polymeric membrane; and the non-aqueous electrolyte is a solution of a lithium salt dispersed in an organic solvent.

7. A lithium-ion secondary battery comprising:

two or more secondary cells; and one or more housings, such that an internal wall from one of the one or more housings encapsulates at least one or more of the secondary cells;

wherein each of the one or more secondary cells comprises:

a positive electrode, the positive electrode comprising an active material as a cathode for the cell and a current collector that is in contact with the cathode;

wherein lithium ions flow from the cathode to an anode when the cell is charging;

a negative electrode, the negative electrode comprising an active material as the anode for the cell and a current collector that is in contact with the anode;

wherein lithium ions flow from the anode to the cathode when the cell is discharging;

a non-aqueous electrolyte positioned between and in contact with both the negative electrode and the positive electrode; wherein the non-aqueous electrolyte supports the reversible flow of lithium ions between the positive electrode and the negative electrode; and a separator placed between the positive electrode and negative electrode, such that the separator separates the anode and a portion of the electrolyte from the cathode and the remaining portion of the electrolyte;

wherein the separator is permeable to the reversible flow of lithium ions there through;

wherein an inorganic additive is dispersed within at least a portion of the positive electrode, the negative electrode, or a combination thereof, and is absent from the non-aqueous electrolyte and the separator;

the inorganic additive being one or more zeolites having a zeolite framework of CHA, CHI, FAU, LTA, or LAU with a silicon (Si) to aluminum (Al) ratio ranging from about 2 to about 50 that absorbs one or more of moisture, free transition metal ions, or hydrogen fluoride (HF) that become present in the cell;

wherein the inorganic additive comprises particles having a morphology that is plate-like, cubic, spherical, or a combination thereof and an average particle size (D5o) that is in the range of 0.05 micrometers (um) to about 1.5 micrometers (um);

wherein the inorganic additive comprises a concentration of greater than or equal to 0.07 wt. % to and less than 10 wt. % sodium (Na) ions and a concentration of 3 wt. % to 7.5 wt. % lithium (Li) ions based on the overall weight of the inorganic additive;

wherein each secondary cell after 100 cycles of C/5 charge-and-discharge exhibits a loss in discharge capacity and in Coulombic efficiency that is less than a loss in the discharge capacity and Coulombic efficiency exhibited by a cell having the same composition except for the inorganic additive.

8. The battery according to claim 7, wherein the inorganic additive further comprises at least one of the following attributes:

(i) particles having the morphology that is spherical;

(ii) a surface area that is in the range of about 10 m2/g to about 1000 m2/g; and (iii) a pore volume range of 0.1-2.0 cc/g.

9. The battery according to claim 7, wherein the inorganic additive includes a sodium (Na) concentration that is less than 7.5 wt. % based on the overall weight of the inorganic additive.

10. The battery according to claim 7, wherein the inorganic additive is a lithium-ion exchanged zeolite.

11. The battery according to claim 7, wherein the inorganic additive scavenges transition-metal cations and hydrofluoric acid via an ion-exchange mechanism.

12. The battery according to claim 7, wherein the positive electrode comprises a lithium transition metal oxide or a lithium transition metal phosphate;

the negative electrode comprises graphite, a lithium titanium oxide, silicon metal, or lithium metal;

the separator is a polymeric membrane; and the non-aqueous electrolyte is a solution of a lithium salt dispersed in an organic solvent.

13. A pair of electrodes in an electrochemical cell, the pair of electrodes comprising a positive electrode and a negative electrode;

wherein the positive electrode includes an active material as a cathode for the cell and a current collector that is in contact with the cathode;

wherein lithium ions flow from the cathode to an anode when the cell is charging;

wherein the negative electrode includes an active material as the anode for the cell and a current collector that is in contact with the anode;

wherein lithium ions flow from the anode to the cathode when the cell is discharging;

wherein an inorganic additive is dispersed within at least a portion of the positive electrode, the negative electrode, or a combination thereof, and is absent from the non-aqueous electrolyte and the separator;

the inorganic additive being one or more zeolites having a zeolite framework of CHA, CHI, FAU, LTA, or LAU with a silicon (Si) to aluminum (Al) ratio ranging from about 2 to about 50 that absorbs one or more of moisture, free transition metal ions, or hydrogen fluoride (HF) that become present in the cell;

wherein the inorganic additive comprises particles having a morphology that is plate-like, cubic, spherical, or a combination thereof and an average particle size (Dso) that is in the range of 0.05 micrometers (um) to about 1.5 micrometers (um);

wherein the inorganic additive comprises a concentration of greater than or equal to 0.07 wt. % and less than 10 wt. % sodium (Na) ions and a concentration of 3 wt. % to 8-7.5 wt. % lithium (Li) ions based on the overall weight of the inorganic additive;

wherein the electrochemical cell after 100 cycles of C/5 charge-and-discharge exhibits a loss in discharge capacity and in Coulombic efficiency that is less than a loss in discharge capacity and Coulombic efficiency exhibited by a cell having the same composition except for the inorganic additive.

14. The electrodes according to claim 13, wherein the inorganic additive further comprises at least one of the following attributes:

(i) particles having the morphology that is spherical;

(ii) a surface area that is in the range of about 10 m2/g to about 1000 m2/g; and (iii) a pore volume range of 0.1-2.0 cc/g.

15. The electrodes according to claim 13, wherein the inorganic additive includes a sodium (Na) concentration that is less than 7.5 wt. % based on the overall weight of the inorganic additive.

16. The electrodes according to claim 13, wherein the inorganic additive is a lithium-ion exchanged zeolite.

17. The electrodes according to claim 13, wherein the inorganic additive scavenges transition-metal cations and hydrofluoric acid via an ion-exchange mechanism.

18. The electrodes according to claim 13, wherein the positive electrode comprises a lithium transition metal oxide or a lithium transition metal phosphate and the negative electrode comprises graphite, a lithium titanium oxide, silicon metal, or lithium metal.

* * * * *